United States Patent [19]
Utsumi et al.

[11] Patent Number: 4,867,529
[45] Date of Patent: Sep. 19, 1989

[54] SUPER-THIN FIBERSCOPE

[75] Inventors: Atsushi Utsumi; Shinichi Okuno; Hiroyuki Hayami, all of Itami, Japan

[73] Assignee: Mitsubishi Cable Industries, Ltd., Japan

[21] Appl. No.: 189,706

[22] Filed: May 3, 1988

[30] Foreign Application Priority Data

May 9, 1987 [JP] Japan .................... 62-113056

[51] Int. Cl.⁴ .................................. G02B 6/06
[52] U.S. Cl. ........................ 350/96.25; 350/96.34
[58] Field of Search ............... 350/96.25, 96.34

[56] References Cited

U.S. PATENT DOCUMENTS 4,593,973 6/1986 Yoshida et al. ............... 350/96.29
4,647,153 3/1987 Utsumi et al. ................. 350/96.25
4,778,247 10/1988 Carpenter ................... 350/962.5 X
4,783,135 11/1988 Utsumi et al. ............... 350/96.34 X Primary Examiner—John D. Lee
Assistant Examiner—Phan T. Heartney
Attorney, Agent, or Firm—William H. Eilberg

[57] ABSTRACT

A super-thin fiberscope having a main scope body which comprises a plurality of multi-component glass light guide fibers for transmitting light to illuminate a target to be viewed, a silica glass image guide for transmitting an image of the target, and a thin-walled main tube made of an imide resin and enclosing the image guide and the light guide fibers. The main tube has an outer diameter of 0.25 mm to 0.6 mm and a wall thickness of 10 $\mu$m to 30 $\mu$m.

12 Claims, 4 Drawing Sheets

SUPER-THIN FIBERSCOPE

BACKGROUND OF THE INVENTION

1. Field of the Invention

This invention relates generally to fiberscopes, and more particularly to a super-thin fiberscope which can be advantageously used, primarily but not exclusively, for medical and diagnostic purposes.

2. Description of the Prior Art

Fiberscopes themselves are not new. They have been popularly used in the medical field since the mid-1950's as well as in the industrial field since the mid-1960's.

Fiberscopes for use in the medical and diagnostic field are required to be super-thin and appropriately flexible to provide easy access to various targets within the human body. In addition, the fiberscope must also have a certain degree of rigidity to enable insertion into the human body by pushing. Further, despite the extremely small diameter, the fiberscope must ensure a clear image of the target for correct inspection.

Various attempts have been made to provide a super-thin fiberscope which meets all of the above requirements.

U.S. Pat. No. 4,593,973 to Yoshida et al discloses a super-thin fiberscope which comprises an image guide integrally contained in a transparent material body. The transparent body serves as a light guide and is formed with a through-bore for injection of a physiological saline solution. This transparent body is made of a resin, such as polymethyl methacrylate, polystyrene or polycarbonate, which has a high light transmittance.

The fiberscope of the above patent is disadvantageous in various respects.

Firstly, the light guide provided by the transparent resin body is far lower (about 1/10) in light transmittance than a conventional light guide provided by multi-component glass fibers. Therefore, in order to provide enough light for illuminating a target, the transparent resin body, hence the fiberscope as a whole, must be made relatively small in length when made extremely small in diameter. In fact, the fiberscope of this patent can have a diameter of not more than 0.7 mm only when used for dental application where a relatively short fiberscope is acceptable.

Secondly, the transparent resin body must be formed internally and externally with a cladding and possibly further with a fluorinated resin coating to eliminate light leakage and surface flaws, consequently increasing production cost.

In the third place, the transparent resin body, which is an integral body serving as a light guide, lacks flexibility and yet fails to provide a mechanical strength required for insertion into the human body.

The above U.S. patent further discloses as "Prior Art" a fiberscope which comprises a heat-shrinkable tubular casing accommodating an image guide, a plurality of light guide fibers, and a brine injection tube. However, the heat-shrinkable casing lacks mechanical strength, failing to realize a diameter of not more than 1 mm.

SUMMARY OF THE INVENTION

It is, therefore, an object of the present invention to provide a super-thin fiberscope which, despite its extremely small diameter, is capable of providing required physical properties and easy access to various targets within the human body while ensuring a clear image of the target.

Another object of the invention is to provide a super-thin fiberscope which provides a broadened range of visual inspection.

According to the invention, there is provided a super-thin fiberscope having a main scope body comprising: a plurality of multi-component glass light guide fibers for transmitting light to illuminate a target to be viewed; a silica glass image guide for transmitting an image of the target; and a thin-walled main tube made of an imide resin and having an outer diameter of 0.25 mm to 0.6 mm.

Other objects, features and advantages of the invention will be readily understood from the following detailed description given with reference to the accompanying drawings.

DETAILED DESCRIPTION

Figure 1:
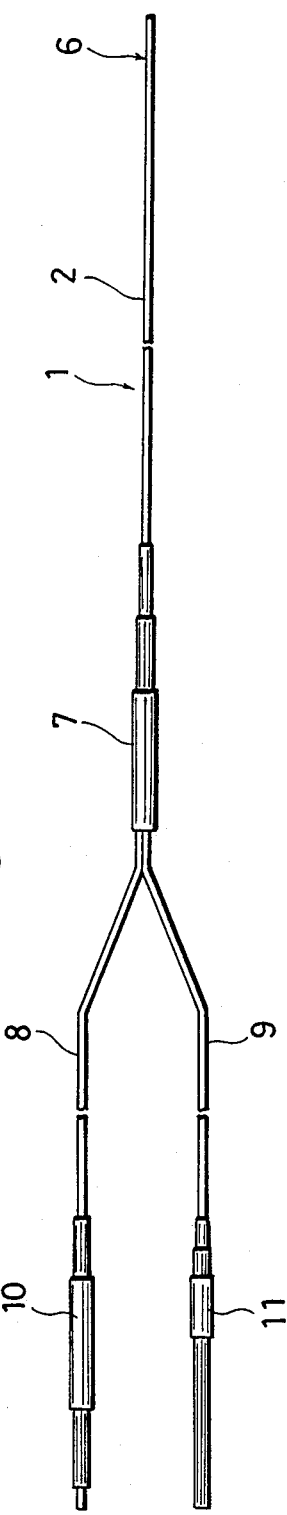
FIG. 1 is a schematic overall view showing a super-thin fiberscope according to the invention.

Referring first to FIG. 1 of the accompanying drawings, there is illustrated a super-thin fiberscope which comprises a main scope body 1 having a considerable length and connected through a branch connector 7 to an image guide tube 8 and a light guide tube 9. The main scope body 1 has a front end 6 forming an objective to be brought close to a target (not shown) to be viewed. The image guide tube 8 is connectable through a socket pipe 10 to a viewer or eyepiece (not shown), whereas the light guide tube 9 is connectable through another socket pipe 11 to a light source (not shown). The viewer and the light source may form a single unit.

Figure 2:
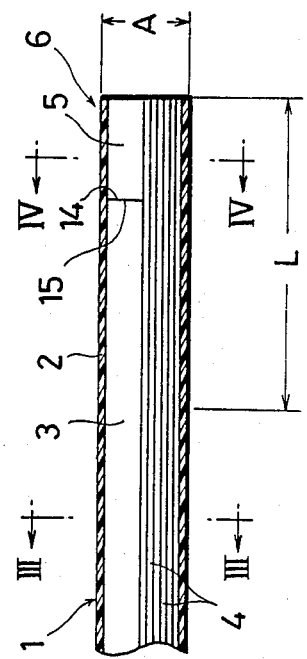
FIG. 2 is a view showing a principal portion of the fiberscope in longitudinal section.
Figure 3:
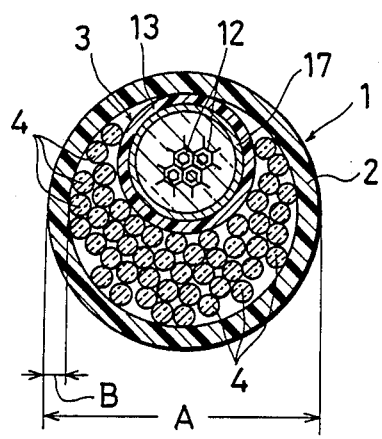
FIG. 3 is a sectional view taken on lines III—III in FIG. 2.
Figure 4:
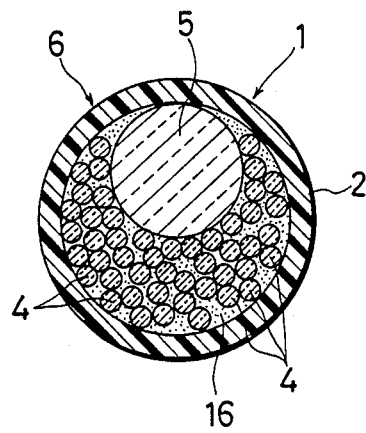
FIG. 4 is a sectional view taken on lines IV—IV in FIG. 2.

As illustrated in FIGS. 2 to 4, the main scope body 1 includes a thin-walled main tube 2 accommodating an image guide 3, a plurality of light guide fibers 4, and an objective lens 5 in the form of a rod lens. The rod lens 5 is located at the front end 6 of the scope body 1 (FIG. 2) with its front end face kept flush with the front extremity of the main tube 2. The image guide 3 has a front end face 14 in contact with the rear end face 15 of the rod lens 5, and extends therefrom all the way through the main tube 2, the branch connector 7, and the image guide tube 8 to the rear end of the socket pipe 10 (see also FIG. 1). Each of the light guide fibers 4 has a front end face located flush with the front end face of the rod lens 5, and extends through the main tube 2, the branch connector 7, and the light guide tube 9 to the rear end of the socket pipe 11.

Figure 5:
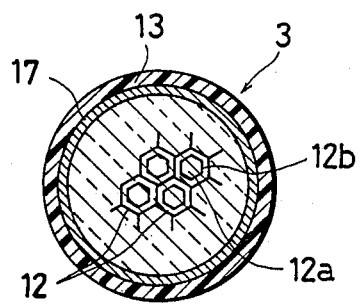
FIG. 5 is a sectional view taken on lines III—III in FIG. 2 but showing only an image guide on an enlarged scale.

As best illustrated in FIG. 5, the image guide 3 comprises a bundle of image guide fibers 12 enclosed in a pure silica glass skin layer 17 which in turn is enclosed in a tubular reinforcing layer 13. Each image guide fiber 12 has a silica glass core 12a and a silica glass clad 12b to form a picture element. The image guide 3 is manufactured in the manner illustrated in FIGS. 6a and 6b.

Figure 6A:
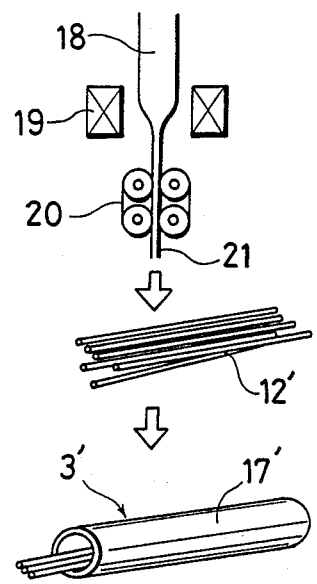
FIGS. 6a and 6b are schematic views showing the process of manufacturing the image guide.
Figure 6B:
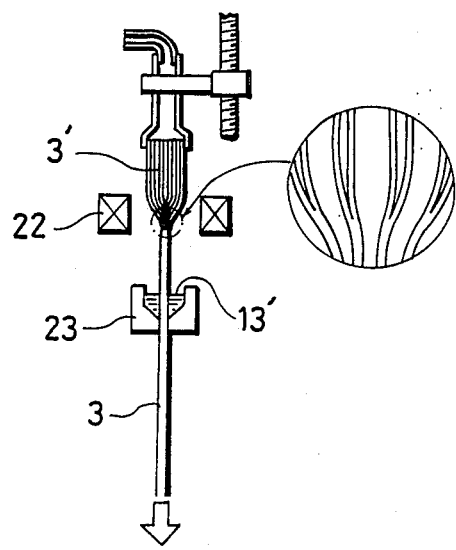

First, as shown in FIG. 6a, a preform 18 is passed through an electric furnace 19 and drawn by a drawing device 20 into a mother fiber 21 of a predetermined diameter. The mother fiber 21 is then cut into lengths 12' A specified number of thus cut mother fibers 12' are compactly arranged in a pure silica glass pipe 17' to provide a fiber assembly 3'. Subsequently, the fiber assembly 3' is melt-drawn through another electric furnace 22 where the mother fibers 12' are fused to each other, as illustrated in FIG. 6b. Finally, the fiber assembly 3', which has been properly reduced in diameter, is passed through a resin reservoir 23 where it is coated with a suitable organic resin 13' to provide a final image guide 3.

It is readily appreciated that the cut mother fibers 12' of FIG. 6a constitute the individual image guide fibers 12 shown in FIG. 5, whereas the pure silica glass pipe 17' constitutes the pure silica skin layer 17. It is further noted that the reinforcing layer 13, which is a primary coat to prevent surface scratches or flaws, is provided by the organic resin 13' (FIG. 6b).

The pure silica glass pipe 17' (forming the skin layer 17) is used to enable the subsequent melt-drawing (FIG. 6b). The wall thickness of the skin layer 17 is preferably 3 $\mu$m to 20 $\mu$m because a smaller thickness results in poor mechanic strength, while a larger thickness poses a difficulty in ensuring suitable flexibility.

The outer diameter of the image guide 3 is preferably 0.15 mm to 0.4 mm. A diameter larger than 0.4 mm leads to poor flexibility, whereas a diameter less than 0.15 mm gives an excessive limitation on the number of the image guide fibers 12 accommodated in the reinforcing tube 13 to result in poor resolution.

The organic resin reinforcing layer 13 is advantageously charred or carbonized over its entire length because the wall thickness of the layer 13 reduces without noticeable decrease in mechanical strength as a result of such carbonization. The carbonization should be conducted at least reinforcing layer 13 reduces down to not more than 90%, particularly not more than 65% (not more than 50% in an extreme case), of the pretreatment wall thickness thereof. For this purpose, the charring treatment is conducted at a temperature of 250° C. to 400° C. for a period of 5 seconds (for higher temperature treatment) to 200 minutes (for lower temperature treatment). However, excessive carbonization will result in unacceptable reduction in mechanical strength, so that there is a certain limitation on degree of such carbonization. For details of the charring treatment, reference can be made to pending U.S Application No. 076,256.

The wall thickness of the reinforcing layer 13 charred as above is preferably 2 $\mu$m to 50 $\mu$m. A thickness less than 2 $\mu$m makes the layer 13 liable to rupture at thinner portions in case of thickness irregularities. A thickness larger than 0 $\mu$m, on the other hand, causes a problem in ensuring a suitable flexibility.

The diameter of each picture element fiber 12 is 4 $\mu$m to 6 $\mu$m, preferably 4 $\mu$m to 5 $\mu$m. With a diameter of less than 4$\mu$m, the wall thickness of the clad 12b becomes insufficient to deteriorate resolution. A diameter of more than 6 $\mu$m should be avoided to ensure that at least about 1,000 picture elements are accommodated within the limited interior space of the reinforcing tube 13. The greater the number of picture elements, the better is the resolution. However, since the minimum diameter of the picture element fiber is limited to 4 $\mu$m, the maximum number of picture elements to be incorporated in the limited interior space of the reinforcing tube 13 is also restricted to about 10,000.

Each of the light guide fibers 4 (FIGS. 3 and 4) consists of a multi-component glass core (not shown) and a multi-component glass clad (not shown). The diameter of the light guide fiber 4 is preferably 20 $\mu$m to 50 $\mu$m. With a diameter of less than 20 $\mu$m, the light guide fiber 4 may break under a tensile force applied to it when pulled into the main tube 2 for assembly (as hereinafter described) of the scope body 1. A diameter larger than 50 $\mu$m results in insufficient flexibility.

As illustrated in FIG. 4, an adhesive 16 is charged into the front end portion 6 of the main scope body 1 or main tube 2. The charged adhesive 16 extends over a length L beyond the rear end face 15 of the rod lens 5 (FIG. 2). The adhesive 16 serves to secure the image guide 3, the light guide fibers 4, and the rod lens 5 within the length L. The portions length L are kept free in the main tube 2 to provide suitable flexibility of the scope main body 1 as a whole.

According to the illustrated embodiment, the rod lens 5 has a length of 0.5 mm to 1.5 mm, so that the adhesive charging length L is preferably 2 mm to 5 mm. The diameter of the rod lens 5 is substantially equal to that of the image guide 3.

The main tube 2, which forms the most important part of the invention, is made of an imide resin. The imide resin makes it possible to reduce the diameter A (FIG. 3) of the main tube 2 to not more than 0.6 mm, preferably 0.5 mm, while satisfying various physical and chemical requirements such as mechanical strength and chemical resistance.

Among various imide resins, preferably usable are polyimides which have at least 30 mole %, advantageously at least 50 mole %, of the recurring imide group represented by the following formula:

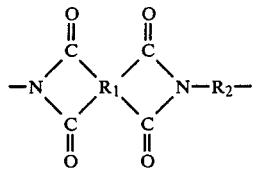

A polyimde having the above recurring imide group can be prepared by reacting a diamine or a diisocyanate with a tetracarboxylic acid or a derivative thereof, and thereafter by heating the polyamide acid thus obtained in order to change it to the final polyimide. $R_1$ and $R_2$ in the above formula are tetravalent organic group of aliphatic, alicyclic, aromatic or heterocyclic nature having a total carbon number of from 4 to about 50, especially from 6 to about 20.

Examples of diamines include meta-phenylene diamine; para-phenylene diamine; 2,2-bis(4-aminophenyl)-propane; 4,4'-diaminodiphenyl methane; 4,4'-diaminodiphenyl sulfide; 4,4'-diaminodiphenyl sulfone; 3,3'-diaminodiphenyl sulfone; 4,4'-diaminodiphenyl ether; 2,6-diaminopyridine; bis(4-aminophenyl)diethyl silane; bis(4-aminophenyl)diphenyl benzidine; bis(4-aminophenyl)ethyl phosphine oxide; 4,4'-diaminobenzophenon; bis(4-aminophenyl)phenyl phosphine oxide; bis(4-aminophenyl)-N-butylamine; bis(4-aminophenyl)-N-methylamine; 1,5-diaminonaphthalene; 3,3'-dimethyl-4,4'-diaminobiphenyl; N-(3-aminophenyl)-4-aminobenzamide; 4-aminophenyl-3-aminobenzoate; 2,4-bis(beta-amino-t-butyl)toluene; bis(p-beta-amino-t-butylphenyl)ether; p-bis(2-methyl-4-aminopentyl)benzene; p-bis(1,1-dimethyl-5-aminopentyl)benzene; m-xylylene diamine; p-xylylene diamine;

Examples of diisocyanates include ethylene diisocyanate; 1,4-tetramethylene diisocyanate; 1,6-hexamethylene diisocyanate; 1,12-dodecane diisocyanate; cyclobutene-1,3-diisocyanate; cyclohexane-1,3-diisocyanate; cyclohexane-1,4-diisocyanate; 1,3-phenylene diisocyanate; 2,6-tolylene diisocyanate, and mixtures thereof.

Examples of tetracarboxylic acids or their derivatives include pyromellitic dianhydride; 2,3,6,7-naphthalenetetracarboxylic dianhydride; 1,2,5,6-naphthalene-tetracarboxylic anhydride; 3,4,9,10-perylene tetracarboxylic dianhydride; naphthalene-1,2,4,5-tetracarboxylic dianhydride; naphthalene-1,4,5,8-tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; phenanthrene-1,8,9,10-tetracarboxylic dianhydride; pyrizine-2,3,5,6-tetracarboxylic dianhydride; benzene-1,2,3,4-tetracarboxylic dianhydride; thiophene-2,3,4,5-tetracarboxylic dianhydride; and mixtures thereof.

Polyimides usable in the present invention are disclosed for example in U.S. Pat. Nos. 2,710,853, 2,712,543, 2,731,447, 2,880,230, and 2,900,369. Other imide resins usable in the invention include polyamideimides such as those disclosed in U.S. Pat. Nos. 2,421,024 and 3,182,073, and polyesterimides such as those disclosed in U.S. Pat. No. 4,329,397.

As described hereinbefore, the outer diameter A of the imide resin main tube 2 is not larger than 0.6 mm, preferably not more than 0.5 mm. With a diameter exceeding 0.6 mm, the main tube 2, when bent to a great degree, is likely to buckle with constriction in cross section (or deformation to a non-circular cross section) because of movability of the image guide 3 or the light guide fibers 4 within the main tube 2, giving an adverse damage to the scope body 1. On the other hand, the outer diameter A of the main tube 2 is at least 0.25 mm in order to provide a sufficient interior space for accommodation of the image guide 3 (at least 0.15 mm in diameter as previously described) and the light guide fibers 4.

The wall thickness B (FIG. 3) of the main tube 2 is preferably 10 $\mu$m to 30 $\mu$m. With a thickness of less than 10 $\mu$m, the main tube 2 becomes liable to formation of pin holes, while a thickness beyond 30 $\mu$m may result in poor flexibility.

In manufacture of the main tube 2, a thin core wire (not shown) made of copper for example is dipped in a bath (not shown) of imide resin liquid, and passed through a die (not shown). Subsequently, the resin liquid deposited on the core wire is cured by heating. These operations are repeated (usually 7 or 8 times) until the thickness of the resin coating increases to 10 $\mu$m to 30 $\mu$m. Finally, the core wire is pulled out of the hardened resin coating or tube, and copper powder remaining on the interior surface of the tube is washed away by a strong acid (e.g. sulfuric acid, hydrochloric acid) which is thereafter neutralized by a base (e.g. sodium hydroxide) or diluted by water.

The imide resin main tube 2 thus obtained fully meets various physical requirements. Particularly, the tube 2 is required to have a high tensile strength to prevent rupture during use of the fiberscope. More specifically, when the main tube is bent during use of the fiber scope, it is subjected to a tensile force on one side of its longitudinal axis, while the other side is subjected to compression (such compression leading to cross-sectional constriction of the tube as previously described). Therefore, a tensionally weak tube may rupture at the time of bending.

To confirm the advantages of the present invention, three tubes made of different imide resins were tested for their tensile strength. Each tube tested had an outer diameter of 0.5 mm, an inner diameter of 0.45 mm, and a wall thickness of 25 $\mu$m. The following table shows the test results.

TABLE

| Material | Tensile Strength |
| --- | --- |
| Polyimide | 0.65 kg |
| Polyamideimide | 0.60 kg |
| Polyesterimide | 0.62 kg |

It is mentioned for comparison that a polyethylene tube having an outer diameter of 0.8 mm, an inner diameter of 0.45 mm, and a wall thickness of 175 $\mu$m has been found to exhibit a tensile strength of only 0.45 kg. This sufficiently supports an unexpected advantage of the present invention.

Further, the imide resin tube (outer diameter: 0.5 mm, inner diameter 0.45 mm, wall thickness: 25 $\mu$m) of the invention has been found to withstand bending to a curvature of 10 mm diameter without cross-sectional constriction. On the other hand, an imide resin tube having an outer diameter of 0.7 mm, an inner diameter of 0.65 mm, and a wall thickness of 25 $\mu$m has been found to suffer cross-sectional constriction when bent to a curvature of 10 mm diameter.

Still further, it has been experimentally confirmed that the imide resin tube of the invention resists strong acids and bases (as required for its manufacture) in addition to being free from toxic elution or extraction during use (substantially no toxic extracts detected after extraction in 100° C. boiling water for 30 minutes).

In assembly of the scope body 1 (FIG. 2), the image guide 3 with the rod lens 5 preliminarily bonded thereto and the light guide fibers are connected to a guide wire (not shown) which is first pulled into the tube 2 for insertion thereinto of the image guide 3 and the light guide fibers 4 and thereafter removed.

In use for inspection of blood vessels, trachea, ureter, or oviduct for example, the scope body 1 (FIG. 1) is inserted into a human body, and the objective end 6 thereof is brought close to the target. The target is illuminated by the light which is fed through the light guide fibers 4 (FIGS. 2 to 4) from the light source (not shown) connected to the socket pipe 11. The image of the target is transmitted through the rod lens 5 (FIG. 2) and the image guide 3 to be viewed through the viewer (not shown) connected to the socket pipe 10.

During such use, the scope body 1 or the main tube 2 can flex freely without cross-sectional constriction to provide ready access to various locations or targets inside the human body while retaining required rigidity for further pushing in. The extremely small outer diameter (not more than 0.6 mm) of the scope body 1 enables inspection of very thin blood vessels and easier insertion into the human body.

Figure 7:
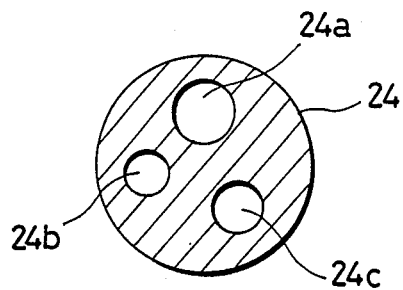
FIG. 7 is a cross-sectional view of a multi-functional catheter in which the fiberscope of the invention may be incorporated.

If required, the fiberscope may constitute a part of a so-called multi-functional catheter as illustrated in FIG. 7. More specifically, the multi-functional catheter includes a plurally bored tube 24. The scope body 1 (FIG. 1) of the fiberscope is inserted for example into a first bore 24a of the catheter tube 24. A second bore 24b of the catheter tube may be used for injecting a medicinal liquid or a physiological saline solution for example, whereas a third bore 24c may be used for introducing laser beams. The catheter tube 24 may be formed with additional bores for other different purposes.

The super-thin fiberscope of the present invention is particularly advantageous when used as a part of such a multi-functional catheter because it contributes significantly to reduction in diameter of the catheter as a whole. In fact, conventional fiberscopes have never been usable in multi-functional catheters. It is thus expected that the fiberscope of the invention makes a remarkable contribution to medical and diagnostic development.

Figure 8:
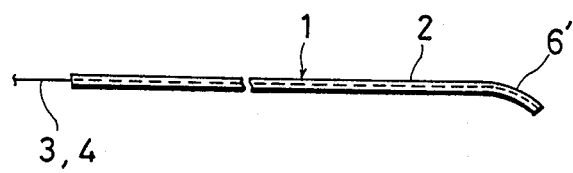
FIG. 8 is a schematic view showing a modified fiberscope according to the invention.

FIG. 8 shows a modification in which a scope body 1 has a curved front end 6'. This curved front end 6' facilitates insertion of the scope body 1 into a curved tubular target (blood vessels and trachea) as well as into a selected branch of a branched tubular target. Further, by turning the scope body 1 about its own longitudinal axis, it is possible to broaden the range of visual inspection.

The fiberscope with the curved front end 6' may be manufactured in the following manner.

Figure 9:
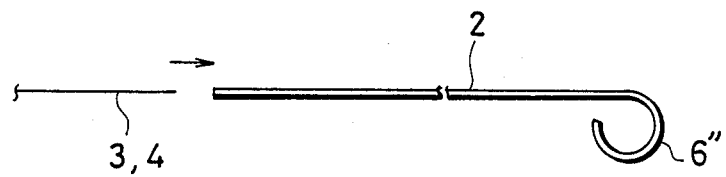
FIG. 9 is also a schematic view showing the process of making the modified fiberscope.

Imide resin liquid is deposited on a thin copper core wire (not shown) to form a tubular coating which is allowed to cure incompletely. Subsequently, a front end portion of the half-cured coating together the core wire inside is wound into a circular form on a mandrel (not shown) which is thereafter placed in a furnace (not shown) heated to a temperature of not less than 200° C. to completely cure the tubular coating. After removal of the core wire, an imide resin tube 2 is formed which has a curled front end portion 6'', as illustrated in FIG. 9. Finally, an image guide 3 and light guide fibers 4 are inserted into the tube 2, whereby the rigidity of the image guide 3 and the light guide fibers 4 balances with the elastic restoring force of the curly front end portion 6'' to provide the suitably curved front end 6', as illustrated in FIG. 8. It should be appreciated that the image guide 3 and the light guide fibers 4 are schematically represented in FIGS. 8 and 9 by a single line for convenience of illustration.

The invention being thus described, it is obvious that the same may be varied in many ways. Such variations are not to be regarded as a departure from the spirit and scope of the invention, all such modifications as would be obvious to those skilled in the art are intended to be included within the scope of the following claims.

We claim:

1. A super-thin fiberscope having a main scope body comprising:
   a plurality of multi-component glass light guide fibers for transmitting light to illuminate a target to be viewed;
   a silica glass image guide for transmitting an image of said target; and
   a thin-walled main tube made of an imide resin and enclosing said image guide and said light guide fibers, said tube having an outer diameter of 0.25 mm to 0.6 mm.

2. The fiberscope as defined in claim 1, wherein said tube is made of a polyimide.

3. The fiberscope as defined in claim 1, wherein said tube is made of a polyamideimide.

4. The fiberscope as defined in claim 1, wherein said tube is made of a polyesterimide.

5. The fiberscope as defined in claim 1, wherein said scope body has a longitudinally curved front end.

6. The fiberscope as defined in claim 1, wherein said tube has a wall thickness of 10 $\mu$m to 30 $\mu$m.

7. The fiberscope as defined in claim 1, wherein said tube has a front end provided therein with a rod lens serving as an objective, wherein the image guide has a front end face, the main tube has a front extremity, and the rod lens has front and rear end faces, and wherein the front end face of the rod lens is flush with the front extremity of the main tube, and the rear end face of the rod lens is in contact with the front end face of the image guide.

8. The fiberscope as defined in claim 1, wherein said image guide and said light guide fibers are fixed, by an adhesive, to said tube only at a front end portion thereof, the adhesive filling the spaces between the image guide, the light guide fibers, and the main tube.

9. The fiberscope as defined in claim 1, wherein said image guide comprises a plurality of silica glass image guide fibers providing picture elements, a tubular silica glass skin layer enclosing said image guide fibers, and a tubular reinforcing layer made of a charred organic resin and enclosing said skin layer.

10. The fiberscope as defined in claim 9, wherein said reinforcing layer has a thickness of 2 $\mu$m to 50 $\mu$m.

11. The fiberscope as defined in claim 9, wherein said organic resin is charred to such a degree that the wall thickness of said reinforcing layer reduces to not more than 90% of that before charring.

12. The fiberscope as defined in claim 11, wherein said organic resin is charred at a temperature of 250° C. to 400° C. for a period of 5 seconds to 200 minutes.

* * * * *